United States Patent Office 2,864,682
Patented Dec. 16, 1958

2,864,682

SELECTIVE METHOD OF INHIBITING PRE-EMERGENT GROWTH OF GRASSES

Angelo J. Speziale, Kirkwood, Mo., assignor to Monsanto Chemical Company, St. Louis, Mo., a corporation of Delaware No Drawing. Application September 13, 1954
Serial No. 455,739

10 Claims. (Cl. 71—2.5)

This invention relates to herbicidal compounds and methods for their use. More particularly, this invention relates to methods of inhibiting the growth of plants, and especially grass in the presence of other vegetation.

Many chemical compounds are known to be deleterious to the growth of vegetation and to have herbicidal effects under specific conditions, some of which compounds are known to be quite effective at low levels of application. It is, however, a more difficult problem to provide useful herbicides for an activity on undesirable plants, but which are harmless to other vegetation. Compounds of this type are known, being primarily useful in eliminating broad leaf plants from grasses or grass-like cereal crops. This herbicidal activity is frequently related to the leaf area exposed to the herbicide, the plants with larger leaf areas being more susceptible to the contact herbicides.

It is the primary purpose of this invention to provide a new and useful class of herbicides. A further purpose of the invention is to provide methods of inhibiting the growth of plants, and especially undesirable grasses growing in the presence of desirable plants. A still further purpose is to provide a new selective pre-emergence herbicide. Other purposes of the invention will be apparent from the following specification.

In accordance with this invention it has been discovered that compounds of the following chemical structure have unusual and valuable herbicidal activity $$Y-\overset{O}{\underset{\|}{C}}-CH_2-Z$$

wherein Z is a halogen atom and wherein Y is a radical derived from a heterocyclic nitrogen ring compound the valent bond of which radical is attached to the nitrogen atom of said radical.

These compounds contain six or five member rings either saturated or unsaturated, as derived from cyclic secondary amines such as morpholine, piperidine, pyrrolidine, pyrrole, pyrroline, gamma-pyridone, α, β or γ-pipecoline, β-pyrrolidone and thiomorpholine, and the corresponding secondary amines having halogen, nitro or alkyl-substituents preferably alkyl-substitutents having up to four carbon atoms.

A preferred group of these heterocyclic nitrogen analogs are those of the following structure

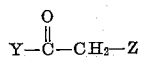

wherein x is a radical selected from the group consisting of —CH$_2$— and —O—, and R is selected from the group consisting of alkyl radicals having up to four carbon atoms, halogen atoms, the hydrogen atom and the nitro radical.

Suitable N-chloroacetyl piperidines and N-chloroacetyl morpholines include, in addition to the unsubstituted products, those with methyl, ethyl, n-propyl, isopropyl, chlorine, bromine, iodine, fluorine and nitro substituents on any one or more of the carbon atoms of the hetero-rings.

The new chemical compounds may be prepared by the reaction of the cyclic secondary amines, and preferably morpholine, piperidine or the substituted morpholines and piperidines with an α-haloacetyl chloride. The reactions are preferably conducted in the presence of aqueous sodium hydroxide and at sub-normal temperatures to prevent a too vigorous rate of reaction. If desired, the reaction may be conducted in the presence of an inert solvent which facilitates the temperature control and the separation of the product. The product may be separated from the reaction mixture and purified by distillation at reduced pressures. Further details are set forth with respect to the following examples.

Example 1

A mixture of 43.6 g. of morpholine, 150 ml. of ethylene dichloride and 120 g. of 20 percent sodium hydroxide solution was placed in a 1,000 ml. flask provided with an efficient stirring device and a reflux condenser. The flask and its contents were cooled to —10° C. To this was added 67.5 g. of chloroacetyl chloride at —10 to —5° C. during two hours with agitation. The mixture was stirred for one half hour after removal of the Dry Ice-ethanol bath. The aqueous layer was separated and extracted with 150 ml. of ethylene dichloride. The extract was combined with the original ethylene dichloride solution and washed with 35 ml. of 5 percent hydrogenchloride, 35 ml. of sodium bicarbonate solution and 35 ml. of water. After drying over anhydrous sodium sulfate and removal of solvent in vacuo, the product was distilled. The colorless product so obtained was identified as N-(chloroacetyl) morpholine.

Example 2

Using the procedure described above, a mixture of 25.5 g. of piperidine, 100 ml. of ethylene dichloride and 72 g. of 20 percent sodium hydroxide was cooled to —10° C. with good agitation. 40.5 g. of chloroacetyl chloride was added at —10° C. over a 35 minute period. The mixture was stirred and allowed to warm to 10° C. during one-half hour. The aqueous layer was separated, washed with ethylene dichloride and discarded. The ethylene dichloride solution and wash were combined, washed with dilute hydrochloride, dilute sodium bicarbonate and water, and dried over anhydrous magnesium sulfate. The solvent was removed by distillation in vacuo and the product was distilled. The product so obtained was identified as N-chloroacetyl piperidine.

Other important herbicidal compounds which are prepared by analogous reactions from the following designated secondary amines are:

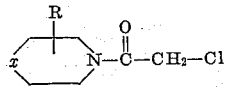

From pyrrolidine

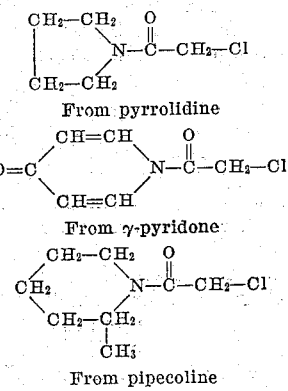

From γ-pyridone

From pipecoline

The relative value of each of the chloroacetamides was determined by planting in greenhouse flats seeds of eight different plants each representing a principal botanical type. The flats were treated with the various herbicides and the observations are set forth below with respect to each of several typical botanical specimens each representing a principal type of plant:

A _____ Wild oat.
B _____ Cheat grass.
C _____ Rye.
D _____ Buckwheat.
E _____ Mustard.
F _____ Beet.
G _____ Cotton.
H _____ Cucumber.

The relative value of each compound with respect to its herbicidal effect on the various plants is indicated by a number as follows:

0 _____ No phytotoxicity.
1 _____ Slight phytotoxicity.
2 _____ Moderate phytotoxicity.
3 _____ Severe phytotoxicity.

N-(chloroacetyl) morpholine, N-(chloroacetyl) pipecoline and N-(chloroacetyl) piperidine were evaluated at the rate of 5 lbs. per acre and were found to be very effective against all types of grasses and with little or no phytotoxicity with respect to certain broad leaf plants.

| | A | B | C | D | E | F | G | H |
|---|---|---|---|---|---|---|---|---|
| N-(chloroacetyl) morpholine | 3 | 3 | 3 | 1 | 1 | 3 | 0 | 3 |
| N-(chloroacetyl) piperidine | 3 | 3 | 3 | 0 | 0 | 1 | 0 | 0 |
| N-(chloroacetyl) α-pipecoline | 2 | 3 | 2 | 1 | 1 | 1 | 0 | 1 |

The use of larger quantities of N-(chloroacetyl) morpholine and N-(chloroacetyl) piperidine was demonstrated by other evaluation experiments using applications of 25 lbs. per acre. It will be noticed that severe phytotoxicity was found for almost all botanical types.

| | A | B | C | D | E | F | G | H |
|---|---|---|---|---|---|---|---|---|
| N-(chloroacetyl) morpholine | 3 | 3 | 3 | 3 | 3 | 3 | 1 | 1 |
| N-(chloroacetyl) piperidine | 3 | 3 | 3 | 2 | 3 | 3 | 1 | 1 |

In order to demonstrate the different effect of closely related compounds, similar tests were performed using N-phenyl α-chloroacetamide and the unsubstituted α-chloroacetamide. It will be noticed that little or no phytotoxicity with respect to most botanical types was found.

| | A | B | C | D | E | F | G | H |
|---|---|---|---|---|---|---|---|---|
| N-phenyl α-chloroacetamide | 0 | 2 | 0 | 0 | 0 | 2 | 0 | 0 |
| Unsubstituted α-chloroacetamide | 0 | 2 | 0 | 0 | 0 | 1 | 0 | 0 |

The critical characteristics of the effective N-substituted α-haloacetates were determined by the study of over 200 different compounds. It has been found that analogous propionamides and butyramides are not herbicidal and that $\alpha,\alpha$-dihalo and $\alpha,\alpha,\alpha$-trihalo derivatives are virtually inactive. The essential single α-halo substituent may however be bromine, iodine or fluorine as well as chlorine. Although the α-haloacetamides without nitrogen substituents are inactive as are the N-phenyl α-haloacetamides, compounds with both amide nitrogen substituents as parts of a single cyclic structure are very useful herbicidal compounds.

Valuable herbicidal effects will be observed by applications of small amounts, for example as low as 1 lb. of active component per acre as well as high concentrations, for example 100 lbs. per acre. The selective activity on grasses is exhibited at lower rates of application, for example from 2 to 15 lbs. per acre. For general application and herbicidal effect on both the grasses and the dicotyledonous plants, it will be found necessary to use from 10 to 50 lbs. per acre.

Selective herbicidal activity with respect to several genera of grasses is illustrated by the data in the above tables.

Other experiments run with respect to plants of different genera, which have different metabolisms and physical characteristics indicate little or no inhibition of growth. The three botanical types, or genera, of grasses which are effectively controlled by means of the α-haloacetamides of this invention, embrace a large number of undesirable plants, or weeds, frequently found in vegetable crops. This invention is not limited to removing grasses from broad leaf plants, since the selective activity will be useful in removing weeds from corn, which belongs to a different genus of grass. Many other crops and particularly the broad leaved plants are inhibited by weeds of the wild oat, cheat and rye genera, which can be effectively controlled by the practice of this invention. In some instances there are minor herbicidal effects on dicotyledonous plants, and therefore optimum results may depend to some extent on experience with respect to the activity of the particular N-substituted α-haloacetamide on the vegetable crop to be treated.

As demonstrated above, unusual grass specificity can be achieved at lower levels of application, whereas at higher levels of application the N-substituted α-haloacetamides exhibit a more general herbicidal effect. This provides another and quite different utility in the removal of plants of a large number or all botanical genera. It will be apparent that quite different effects can be obtained by modifying the method of use. For this reason an essential part of this invention is the formulation so as to permit a uniform predetermined application of herbicide to the plant environment, for example to leaves or soil surfaces, so as to produce the desired effect. By the proper selection and proportioning of the various conditioning agents either liquid or solid formulations can be prepared, and so as to adapt the herbicide for achieving the desired result with any conventional device for treating plant or soil surfaces.

The solid formulations, frequently referred to as "dusts" may contain in addition to the active ingredient, diluents or extenders, dispersing agents to prevent local high concentrations, and agents to facilitate distribution in soil or soil waters. Suitable solid diluents are those which render the compositions permanently dry and free flowing. Thus hydroscopic materials are to be avoided unless the compositions also contain a separate substance to serve as an aid to the flowability. Effective solid diluents, preferably pulverulent or granular in form so as to be effective carriers for the active ingredient, are the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 98 percent by weight, of the entire formulation as applied to plant or soil. More concentrated herbicides will require dilution by the user in order to properly condition the soil for the most effective usage. The concentrated solid herbicidal formulations can be used with less danger if it is mixed with the surface soil by means of a disk-plow or harrow at the time of application.

The liquid compositions for herbicidal use may be solutions, or other liquid dispersions. The choice of a liquid medium will depend to some extent upon the physical properties of the active ingredient. The N-substituted α-haloacetamides may be water-soluble and mere dissolution will then provide a usable formulation. Often the N-substituted α-haloacetamides are only limitedly soluble in water and therefore aqueous formulations will necessarily be dispersions of minute drops of the water-insoluble substances in suspension in an aqueous medium. The known water-insoluble substituted α-haloacetamides of this invention may first be dissolved in a suitable organic solvent and the organic solution of the active ingredient then incorporated in water or in any aqueous medium to produce a heterogeneous dispersion of the active ingredient in water.

One composition which aids in the effectivity of the herbicidal component is a surface active agent which serves in providing uniform dispersions of all formulation components of both solid and liquid types, and may be anionic, cationic or non-ionic types and includes conventional soaps, such as the water-soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefited by the incorporation of organic solvents for the active components, such as the water-immiscible organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil or plant surfaces.

A useful formulation of the herbicidal compositions may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations so that upon dilution with water or a solid extender, compositions containing optimum proportions of dispersing agents and active component will be prepared. The solid or liquid formulations are preferably applied by mechanical equipment involving spraying or spreading the formulation on soil or plant surfaces being treated. For this purpose readily flowable compositions are required, either liquid or solid in physical state. Thus a critical aspect of the invention is the fluent carrier without which the optimum herbicidal effects cannot be achieved.

Both the solid and the liquid formulations above described are useful in the application of herbicides because they facilitate the uniform distribution and aid in the destruction of undesirable plants by maintaining the active ingredient in a form which enables the prompt assimilation by the plant and the efficient utilization of its weed destroying properties. The described conditioning agents enable the proper use to achieve the desired herbicidal effects by an unskilled operator without elaborate equipment.

This application is a continuation-in-part of my application Serial No. 389,452, filed October 30, 1953, and now abandoned.

What is claimed is:
1. The method of selectively inhibiting the germination of grass seeds and the pre-emergence growth thereof in the presence of growing crops, which comprises treating the soil medium with a herbicidal amount of a compound of the structure:

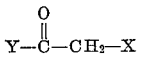

wherein X is a halogen of the group consisting of chlorine, bromine and iodine and wherein Y is an organic nitrogen containing heterocyclic radical derived from amines of the group consisting of morpholine, piperidine, pyrrolidine, pyrrole, pyrroline, gamma-pyridone, alpha-pipecoline, beta-pipecoline, gamma-pipecoline, beta-pyrrolidone, thiomorpholine, and the substituted piperidines and morpholines wherein the substituents are selected from the group consisting of halogen radicals, nitro radicals and alkyl radicals having up to four carbon atoms, the nitrogen atom of the heterocyclic ring being attached directly to the carbonyl group.

2. The method of selectively inhibiting the germination and preemergent growth of grasses from seeds in contact with soil, which comprises treating the said soil with a herbicidal amount consisting of from 1 to 15 pounds per acre of a compound having the structure:

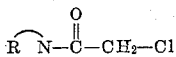

wherein R is a divalent alkylene radical of from four to ten carbon atoms and having from four to five carbon atoms in a continuous chain between the valence bonds.

3. The method of claim 1 wherein the compound is N-(chloroacetyl) morpholine.

4. The method of claim 1 wherein the compound is N-(chloroacetyl) piperidine.

5. The method of claim 1 wherein the compound is N-(chloroacetyl) pyrrolidine.

6. The method of claim 1 wherein the compound is N-(chloroacetyl) pipecoline.

7. The method of claim 2 wherein the compound is N-(chloroacetyl) morpholine.

8. The method of claim 2 wherein the compound is N-(chloroacetyl) piperidine.

9. The method of claim 2 wherein the compound is N-(chloroacetyl) pyrrolidine.

10. The method of claim 2 wherein the compound is N-(chloroacetyl) pipecoline.

References Cited in the file of this patent
UNITED STATES PATENTS 2,614,917  Zukel et al. _____ Oct. 21, 1952
2,703,802  Norton _____ Mar. 8, 1955

OTHER REFERENCES

Jacobs et al., in "Chemical Abstracts," vol. 13, column 1861 (5), 1919.

Ciamician et al. (A), in "Chemical Abstracts," vol. 13, column 2905 (5), 1919.

Ciamician et al., in "Chemical Abstracts," vol. 16, column 1261 (1), 1922.

Youngken et al., in "Chemical Abstracts," vol. 26, column 7215 (8), 1942.

King et al., in "Chemical Abstracts," vol. 39, column 776 (3), 1945.